(12) United States Patent
Cowan et al.

(10) Patent No.: US 8,775,974 B2
(45) Date of Patent: Jul. 8, 2014

(54) MULTI-CONTEXTUAL DELTA NAVIGATION IN A COMPARE VIEW

(75) Inventors: Scott D. Cowan, Ottawa (CA); Kim D. Letkeman, Nepean (CA); Mohammed M. Mostafa, Kanata (CA); Frederic Plante, Chelsea (CA); Vishwanath Ramaswamy, Carlsbad Springs (CA)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 11/313,903

(22) Filed: Dec. 21, 2005

(65) Prior Publication Data
US 2007/0143680 A1    Jun. 21, 2007

(51) Int. Cl.
G06F 3/048    (2013.01)
G06F 9/44    (2006.01)
G06F 17/22    (2006.01)
G06F 17/30    (2006.01)
G06F 17/24    (2006.01)

(52) U.S. Cl.
CPC .............. *G06F 8/71* (2013.01); *G06F 17/2288* (2013.01); *G06F 17/30309* (2013.01); *G06F 8/34* (2013.01); *G06F 3/048* (2013.01); *Y10S 707/99954* (2013.01); *Y10S 707/99952* (2013.01); *Y10S 715/971* (2013.01); *G06F 17/241* (2013.01)
USPC ........... 715/854; 715/781; 715/751; 707/638; 707/395; 707/806; 707/999.203; 707/E17.005; 717/105; 717/113; 717/122; 717/170; 707/999.201; 715/971

(58) Field of Classification Search
CPC ......... G06F 8/71; G06F 8/34; G06F 17/2288; G06F 17/30309; G06F 17/3023; G06F 3/048; G06F 17/241; Y10S 707/99954; Y10S 707/99952; Y10S 715/971
USPC .......... 715/854, 511, 781, 751; 707/204, 638, 707/695, 806, 999.203, E17.005; 717/105, 717/113, 122, 170
See application file for complete search history.

(56) References Cited

U.S. PATENT DOCUMENTS 5,278,979 A    1/1994    Foster et al.
5,551,027 A *    8/1996    Choy et al. ............................ 1/1
(Continued)

FOREIGN PATENT DOCUMENTS

EP    1026586 A2    8/2000
EP    1205842 A2    5/2002

OTHER PUBLICATIONS

David Pogue, Windows Millennium: The Missing Manual, 2000, O'Reilly, p. 74.*

(Continued)

*Primary Examiner* — Patrick Riegler
(74) *Attorney, Agent, or Firm* — Steven M. Greenberg, Esq.; CRGO Law

(57) ABSTRACT

Embodiments of the present invention address deficiencies of the art in respect to comparing artifacts and provide a novel and non-obvious method, system and computer program product for multi-contextual navigation of deltas in a hierarchy. In one embodiment of the invention, a method for multi-contextual navigation can include rendering objects for an artifact utilizing a default contextual view of the objects, selecting an object in the default contextual view and directing an inward navigation to a different object in the default contextual view. Notably, responsive to the directing of the inward navigation to the different object, a different contextual view can be provided for at least a portion of the objects defined by the different object.

15 Claims, 5 Drawing Sheets

(56) References Cited

U.S. PATENT DOCUMENTS

| | | | |
|---|---|---|---|
| 5,623,661 A | 4/1997 | Hon | |
| 5,640,579 A | 6/1997 | Koppolu et al. | |
| 6,018,747 A | 1/2000 | Burns et al. | |
| 6,061,695 A * | 5/2000 | Slivka et al. | 715/203 |
| 6,075,530 A | 6/2000 | Lucas et al. | |
| 6,144,962 A | 11/2000 | Weinberg et al. | |
| 6,226,652 B1 * | 5/2001 | Percival et al. | 707/695 |
| 6,237,006 B1 | 5/2001 | Weinberg et al. | |
| 6,275,223 B1 * | 8/2001 | Hughes | 715/751 |
| 6,393,437 B1 * | 5/2002 | Zinda et al. | 707/201 |
| 6,449,624 B1 * | 9/2002 | Hammack et al. | 1/1 |
| 6,487,713 B1 * | 11/2002 | Cohen et al. | 717/105 |
| 6,532,471 B1 | 3/2003 | Ku et al. | |
| 6,553,563 B2 * | 4/2003 | Ambrose et al. | 717/116 |
| 6,754,885 B1 * | 6/2004 | Dardinski et al. | 717/113 |
| 6,868,425 B1 | 3/2005 | Bergstraesser et al. | |
| 7,131,112 B1 * | 10/2006 | Bartz et al. | 717/122 |
| 7,143,366 B1 * | 11/2006 | McKelvey et al. | 715/234 |
| 7,272,815 B1 * | 9/2007 | Eldridge et al. | 717/101 |
| 7,278,106 B1 * | 10/2007 | Mason | 715/744 |
| 2003/0084425 A1 | 5/2003 | Glaser | |
| 2003/0159136 A1 * | 8/2003 | Huang et al. | 717/171 |
| 2003/0167446 A1 | 9/2003 | Thomas | |
| 2003/0226106 A1 | 12/2003 | McKellar et al. | |
| 2004/0167868 A1 | 8/2004 | Owen et al. | |
| 2004/0167900 A1 | 8/2004 | Owen et al. | |
| 2004/0230557 A1 | 11/2004 | Bales et al. | |
| 2004/0230917 A1 | 11/2004 | Bales et al. | |
| 2005/0039139 A1 | 2/2005 | Schwartz et al. | |
| 2005/0091181 A1 * | 4/2005 | McKee et al. | 707/1 |
| 2005/0091225 A1 * | 4/2005 | McKee et al. | 707/100 |
| 2005/0091667 A1 * | 4/2005 | McKee et al. | 719/328 |
| 2005/0131964 A1 * | 6/2005 | Saxena | 707/203 |
| 2005/0216893 A1 * | 9/2005 | Horton et al. | 717/126 |
| 2006/0184540 A1 * | 8/2006 | Kung et al. | 707/10 |
| 2006/0206865 A1 * | 9/2006 | Reinhardt et al. | 717/108 |
| 2006/0242603 A1 * | 10/2006 | Wong et al. | 715/853 |
| 2006/0248505 A1 * | 11/2006 | Tsukamoto | 717/101 |
| 2007/0061702 A1 * | 3/2007 | Letkeman | 715/511 |
| 2007/0136394 A1 * | 6/2007 | Cowan et al. | 707/203 |

OTHER PUBLICATIONS

Chapman, D. Brent; Majordomo. How I Manage 17 Mailing Lists Without Answering—"request" Mail; 1992 Lisa VI—Oct. 19-23, 1992—Long Beach, CA.

Tellioglu, Horst, Mailing Lists; Dec. 3, 1998 14.15:46 rev.1.2 Exp. [retrieved by WIPO Dec. 3, 1998 at URL: http://timaios.philo.at/Wiki_stuff/mlms.pdf.

Houle, Bill, MajorCool: A Web Interface to Majordomo; Proceedings or the Tenth USENIX System Administration Conference (LISA X) Chicago, IL, Sep. 29-Oct. 4, 1996.

* cited by examiner

MULTI-CONTEXTUAL DELTA NAVIGATION IN A COMPARE VIEW

BACKGROUND OF THE INVENTION

1. Field of the Invention

The present invention relates to the field of artifact version control and more particularly to navigating deltas in a compare view.

2. Description of the Related Art

Version control relates to the management of different versions of artifacts produced through repetitive editing by one or more end editors. Often referred to in the context of source code development, software model development and configuration management, version control involves the management of one or more documents when the documents are edited in succession, parallel or both by one or more editors. Put plainly, version control addresses one of two likely contingencies. In a first contingency, an editor applies edits to a document in succession and requires a view to changes in the document from an ancestor version to a contemporary version. In the other contingency, one or more editors concurrently apply different edits to the same document and the edits must be merged into a unified document.

Merging is a common operation when working with versioned artifacts in a version control system. Wherever two or more editors apply edits to the same version of a file in parallel, a merge is required to harmonize the edits of the parallel artifacts. Merging unstructured textual artifacts can be a relatively simple operation because within an unstructured textual artifact, there is no relationship from one line to the next. By comparison, merging a structured artifact such as source code or markup can be trying, as the skilled artisan will attest.

Notably, when editing an artifact, a simple line to line change can affect the integrity of structures or objects specified within the artifact. In this regard, the more structural the file content, the worse the problem because relationships between structures within an artifact must be maintained during a merge operation in order to protect the integrity of the artifact. Exacerbating matters, each element in an artifact can have multiple properties, each of which can contain or reference one or more other elements in the artifact. As other relationships can exist only in source code, the structure of an artifact can become exceedingly complex—so much so that attempting to edit the artifact within a mere text editor can virtually guarantee the corruption of the artifact as has been demonstrated by sufficient empirical evidence.

Thus, more sophisticated visual merge tools have become the preferred mode of performing a merge operation. The use of a visual merge tool in a version control system, however, is not without its own set of challenges. In this regard, each individual change can appear within the visual merge tool as a single artifact difference referred to in the art as a "delta". Moreover, each individual change to an element in an artifact by a contributor reflected by a delta can be a candidate for conflict in view of a possible change to the same element by another contributor in another version of the artifact.

Visualizing deltas among different modified versions of an ancestor artifact, referred to in the art as a "contributor artifact", can be challenging where a multiplicity of deltas can be identified for any given contributor artifact. To facilitate the visualization of deltas in an artifact, conventional visual compare tools provide for the manual selection of different contextual views for the deltas. In this regard, whereas a hierarchical view of deltas can be appropriate in some circumstances, visualizing changes in a model, for example, can require the use of a diagrammatic view. Likewise, visualizing property changes can require a property view. Finally, visualizing textual changes can require a text view.

Conventional compare tools typically permit the selection of any one of several contextual views for viewing an artifact in a particular context. For instance, one or more tab controls can be provided for a contextual view of an artifact such that the selection of any one of the tab controls can result in the re-rendering of the artifact utilizing a different contextual view associated with the selected tab control. Notwithstanding, repeatedly switching contextual views for an entire artifact can be problematic, distracting and tedious when navigating different deltas in a contributor artifact. Yet, switching contextual views for an artifact is an all or none proposition within conventional compare tools.

BRIEF SUMMARY OF THE INVENTION

Embodiments of the present invention address deficiencies of the art in respect to comparing artifacts in a version control system and provide a novel and non-obvious method, system and computer program product for multi-contextual navigation of deltas in a hierarchy. In one embodiment of the invention, a method for multi-contextual navigation can include rendering objects for an artifact utilizing a default contextual view of the objects, selecting an object in the default contextual view and directing an inward navigation to a different object in the default contextual view. Notably, responsive to the directing of the inward navigation to the different object, a different contextual view can be provided for at least a portion of the objects defined by the different object.

In one aspect of the invention, the default contextual view is a hierarchical view of the objects. In another aspect of the invention, the different contextual view is a diagrammatic view. In yet another aspect of the invention, the different contextual view is a textual view. Finally, in even yet another aspect of the invention, the different contextual view is a properties view. Regardless, rendering objects for an artifact utilizing a default contextual view of the objects, further can include providing an icon adjacent to deltas among the objects indicating at least one of an added object, a removed object, a relocated object and a conflicted object.

Preferably, rendering objects for an artifact utilizing a default contextual view of the objects can include rendering objects for each of an ancestor artifact in an ancestor artifact view and at least one contributor artifact in a contributor artifact view, each within a single compare view. As such, providing a different contextual view for at least a portion of the objects defined by the different object can include providing a different contextual view for at least a portion of the objects for each of the ancestor artifact in the ancestor artifact view and each contributor artifact in a corresponding contributor artifact view. Alternatively, providing a different contextual view can include providing a different contextual view for at least a portion of the objects for only one of the ancestor artifact in the ancestor artifact view and each contributor artifact in a corresponding contributor artifact view.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for the multi-contextual navigation of deltas in a version control system. In accordance with an embodiment of the present invention, a default contextual view can be provided for a set of nodes in a hierarchy of objects of an artifact in a version control system. The hierarchy can include one or more deltas and generally, the hierarchy can be traversed directionally from a root node to a multiplicity of leaf nodes through intermediate nodes. In particular, peer nodes can be traversed by specifying a next or previous node in relation to a current node. By comparison, a child node can be reached from a parent node by specifying an inward movement from the parent node, and a parent node can be reached from a child node by specifying an outward movement from the child node.

Notably, a navigation control can be provided permitting inward, outward, previous and next navigation movements. As such, while the default contextual view can be provided for the hierarchy of objects initially, whenever an inward navigation movement is selected for a node in the hierarchy, a different contextual view can be provided for the node so as to more effectively communicate the content of the node in a context most suitable for the node. More specifically, each different node in the hierarchy can be associated with a default contextual view. Consequently, when an inward navigation command is received in association with a selected node, the default contextual view best able to visualize the selected node can be provided. In this regard, the contextual views can range from a hierarchical view, to a properties view, to a textual view to a diagrammatic view.

In illustration, FIGS. 1A through 1D, taken together, depict a compare view in a version control system configured for multi-contextual navigation. The compare view 100A can provide a structural difference view for one or more contributor artifacts with the objects in a hierarchy for an ancestor artifact. To that end, the compare view 100A can include a visualization window 110 of structural differences between objects in a contributor artifact and those in an ancestor artifact. The visualization window 110 can include an ancestor artifact view 140A, and one or more contributor artifact views 150A, 160A. The ancestor artifact view 140A can provide a rendering of a hierarchical representation of the objects in the ancestor artifact 140A. Likewise, each of the contributor artifact views 150A, 160A can provide a rendering of a hierarchical representation of the objects (both changed and unchanged) in a corresponding contributor artifact.

Figure 1A:
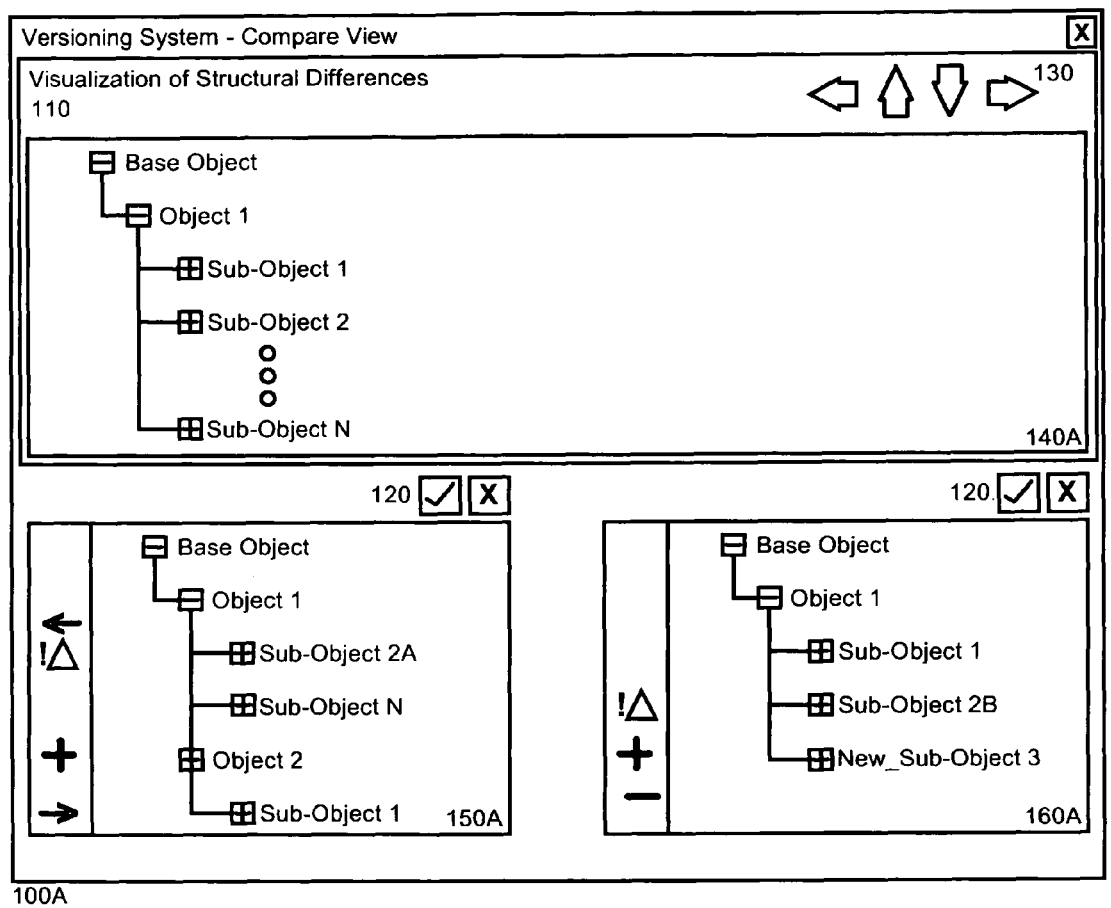
FIGS. 1A through 1D, taken together, are a pictorial illustration of a compare view in a version control system configured for multi-contextual navigation.

As it will be apparent to the skilled artisan, each of the contributor artifact views 150A, 160B can indicate deltas disposed in a corresponding hierarchy. The deltas can indicate either changes that have occurred as between the ancestor artifact and the contributor artifact as shown in FIG. 1A, or the deltas can indicate changes that have occurred as between the contributor artifact and another contributor artifact. To facilitate the identification of deltas, characterization icons can be selectively disposed adjacent to each delta.

For instance, the "+" icon can indicate an addition of a new object to the hierarchy, while a "−" icon can indicate the removal of an existing object from the hierarchy. An "←" icon can indicate the re-positioning of an object from a previous position in the hierarchy, while an "→" icon can indicate the re-positioning of an object to a new position in the hierarchy. Finally, a "Δ" can indicate a change to an object in the hierarchy, and an "!" can identify a conflict between the object in the hierarchy and the counterpart object in a hierarchy for a different contributor artifact. In respect to the latter, accept and reject controls 120 can permit the resolution of a selected conflict in favor of one of the contributor artifacts.

Importantly, a navigation control 130 can be disposed in the visualization window 110. The navigation control 130 can provide for the navigation of a selected one of the hierarchies of the ancestor artifact view 140A and the contributor artifact views 150A, 160A. Specifically, the navigation control 130 can provide for separate user interface controls for commanding next, previous, inward and outward navigation movements relative to a selected node in a hierarchy. Responsive to an inward navigation movement to a destination node, a different contextual view can be provided for the hierarchy based upon a default contextual view associated with the destination node.

Figure 1B:
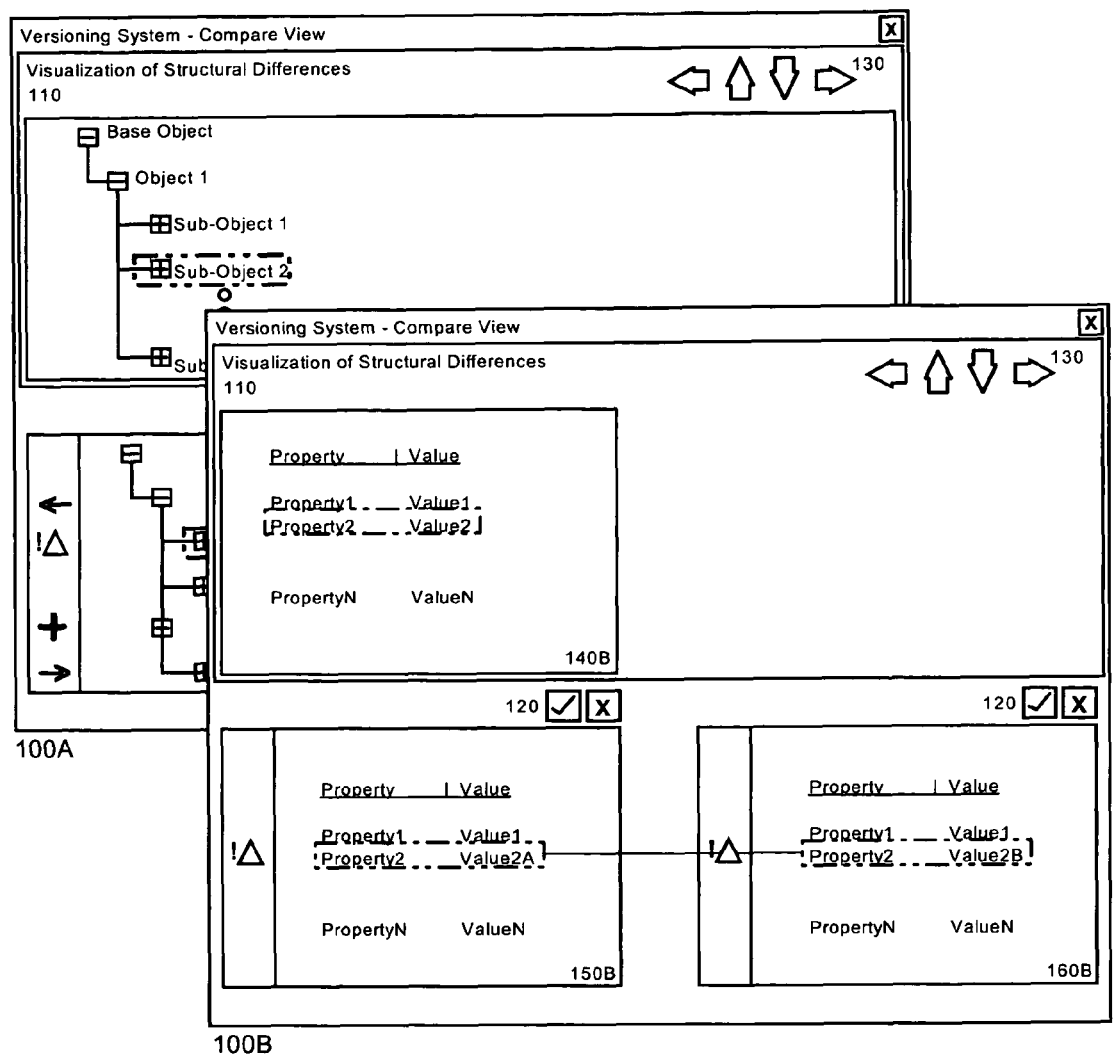

In illustration, referring to FIG. 1B, an inward navigation movement for a selected node leading to a destination node can result in the rendering of a new contextual view for the destination node. In particular, as shown in FIG. 1B, a new compare view 100B can be provided for a destination node responsive to an inward navigation movement which can include a new contextual view for the ancestor artifact view 140B, and contributor artifact views 150B, 160B. The compare view 100B can differ from compare view 100A in that the compare view 100B can include contextual views associated with the destination node. For example, as shown in FIG. 1B, the contextual views of the compare view 100B can be a property view, while the contextual views of the compare view 100A can be a hierarchical view.

Figure 1C:
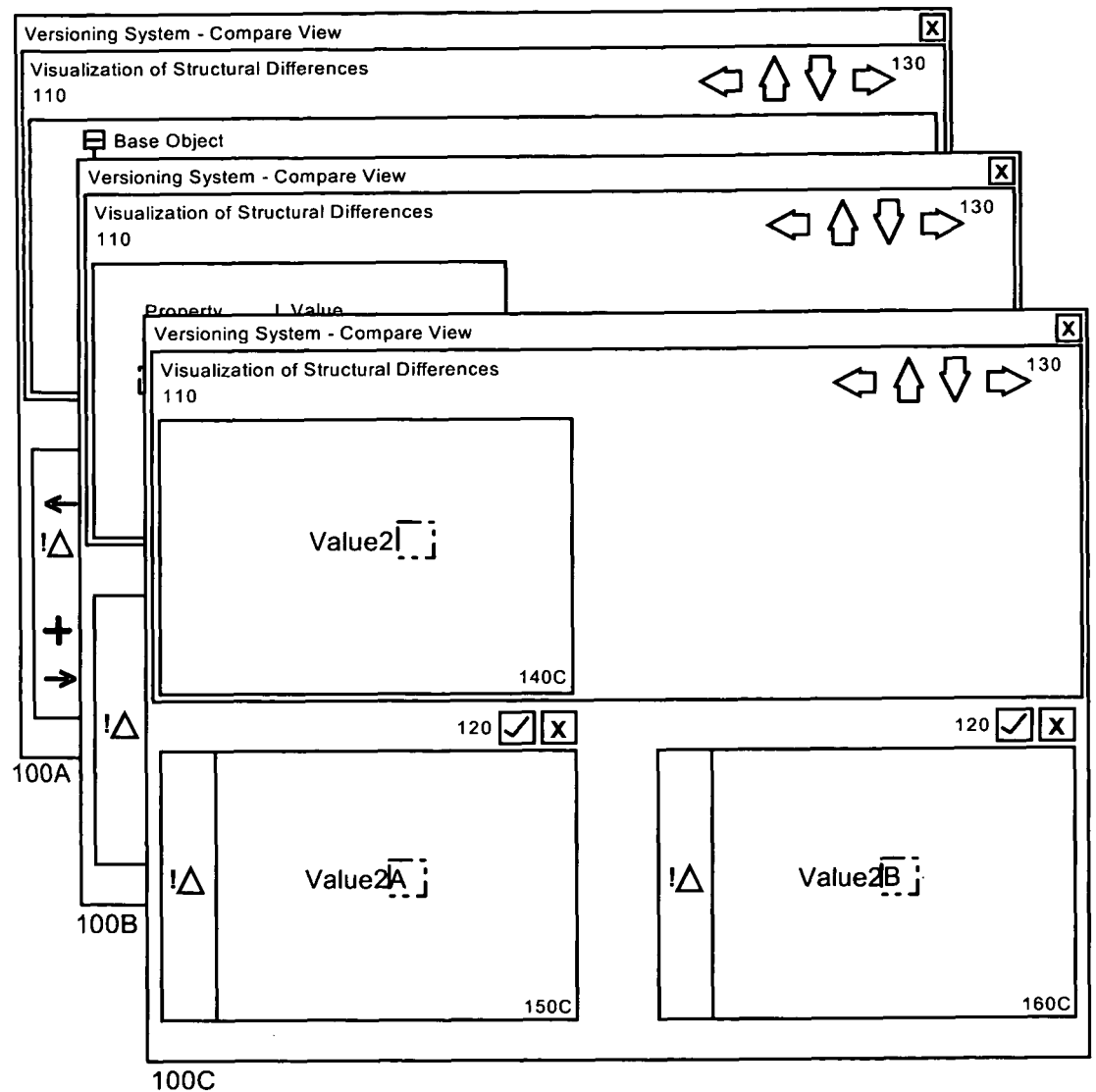

Likewise, referring to FIG. 1C, an inward navigation movement for the destination node leading to yet another destination node can result in the rendering of a new contextual view for the new destination node. In particular, as shown in FIG. 1C, a new compare view 100C can be provided for a destination node responsive to an inward navigation movement which can include a new contextual view for the ancestor artifact view 140C, and contributor artifact views 150C, 160C. The compare view 100C can differ from compare view 100B in that the compare view 100C can include contextual views associated with the new destination node. For example, as shown in FIG. 1C, the contextual views of the compare view 100C can be a textual view, while the contextual views of the compare view 100B can be a properties view.

Figure 1D:
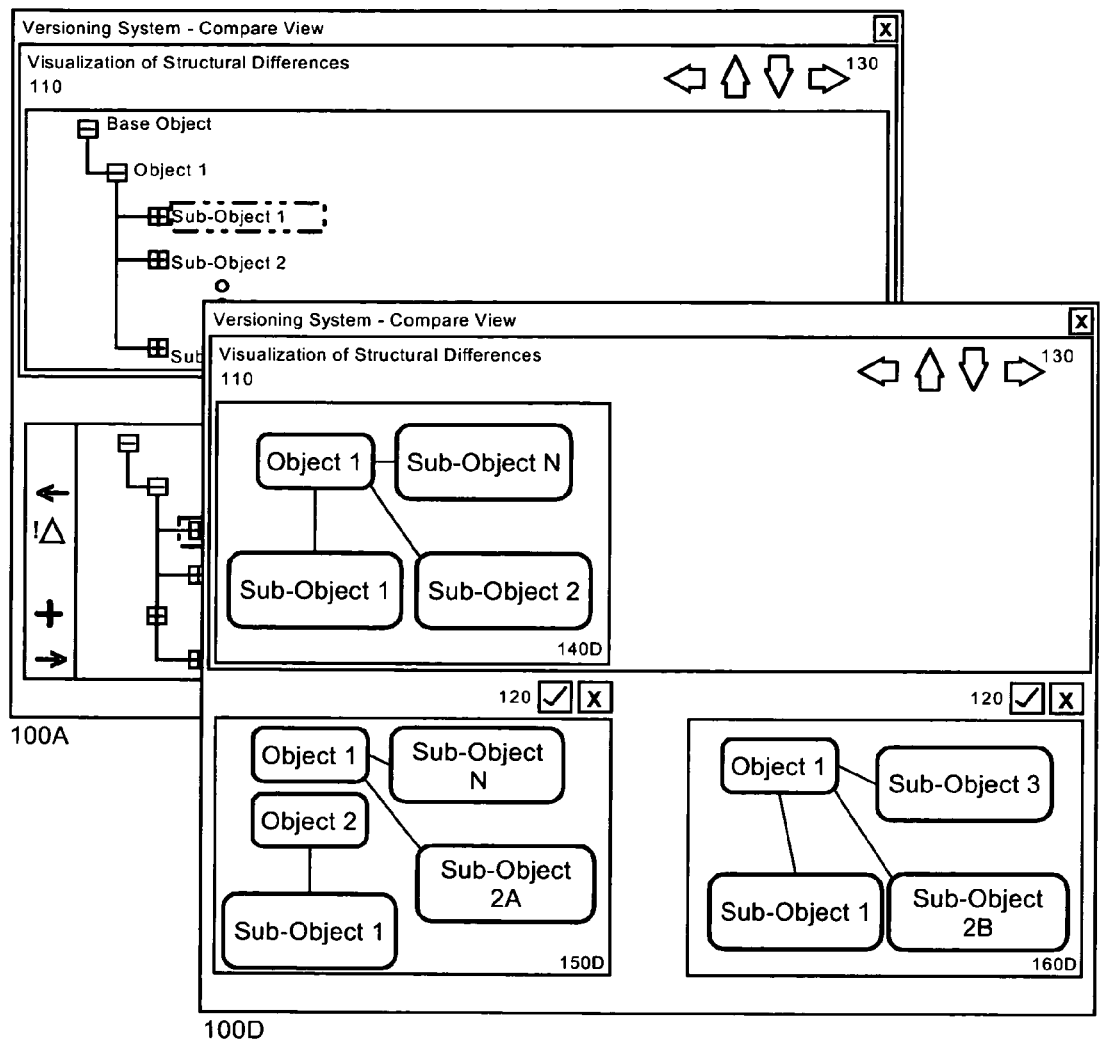

Finally, referring to FIG. 1D, an inward navigation movement leading to a different destination node also can result in the rendering of a new contextual view for the new destination node. In particular, as shown in FIG. 1D, a new compare view 100D can be provided for a destination node responsive to an inward navigation movement which can include a new contextual view for the ancestor artifact view 140D, and contributor artifact views 150D, 160D. The compare view 100D can differ from compare view 100A in that the compare view 100D can include contextual views associated with the new destination node. For example, as shown in FIG. 1D, the contextual views of the compare view 100D can be a diagrammatic view, while the contextual views of the compare view 100A can be a hierarchical view.

Figure 2:
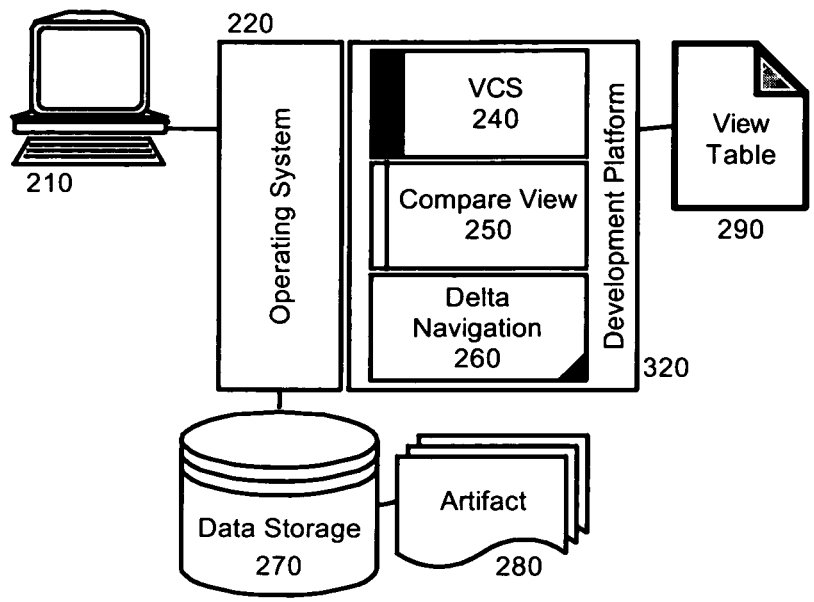
FIG. 2 is a data processing system configured for multi-contextual navigation of deltas in a version control system; and, FIG. 3 is a flow chart illustrating a process for multi-contextually navigating deltas in a version control system.

Notably, the compare view of FIGS. 1A through 1D can be provided by a development platform data processing system configured for multi-contextual navigation as illustrated in FIG. 2. Specifically referring to FIG. 2 a development platform data processing system 210 can include data storage 270 and an operating system 220 hosting the operation of a development platform 230. Development platforms generally are well-known and can include integrated development environments including the Eclipse™ development environment produced by the Eclipse Foundation and amply described and distributed through the Web site referenced at the Internet domain eclipse.org.

The development platform can include a version control system 240 which can provide for a compare view 250. The compare view 250 can be enabled to compare a contributor artifact with an ancestor artifact among a set of artifacts 280 in order to visualize deltas between the artifacts. Examples include changes in a model, changes in a text document, and changes in properties for objects in a model. The compare view 250 further can be enabled to compare differences in two or more contributor artifacts with a common ancestor artifact so as to identify conflicting deltas among the contributor artifacts. Finally, the compare view 250 can provide one or more operations for resolving conflicting deltas in a merge operation. To that end, the compare view 250 can incorporate functionality prevalent in many version control systems such as those present in the IBM Rational ClearCase™ software configuration management product manufactured by International Business Machines Corporation of Armonk, N.Y., United States of America.

In accordance with the present invention, delta navigation logic 260 can be coupled to the compare view 250. The delta navigation logic 260 can include program code enabled to process previous, next, inward and outward navigation directives received through one or more user interface controls for the control view 250. In particular, the program code can be enabled to process an inward navigation directive for a selected node in order to select and render a particular contextual view for a destination node leading inward from the selected node. In this regard, the program code can be enabled to choose the particular contextual view for the destination node from among a set of potential contextual views specified within a view table 290. In this way, a suitable contextual view can be provided for the destination node automatically without requiring an end user to manually select a contextual view for the destination node.

Figure 3:
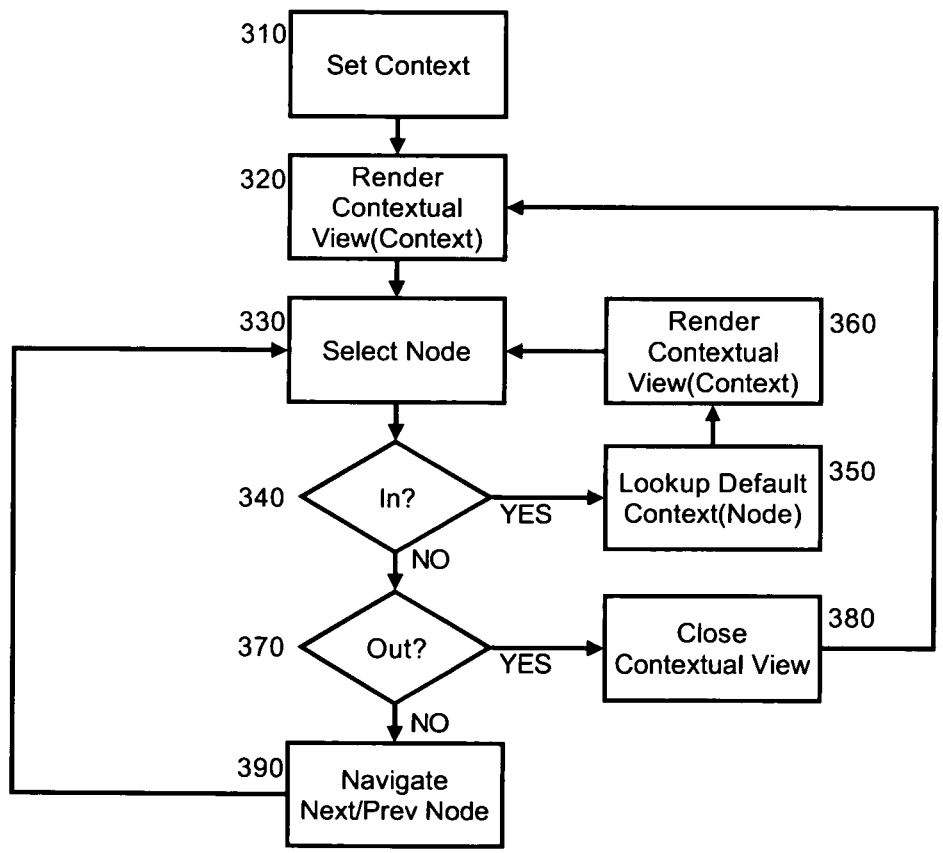

In further illustration of the operation of the delta navigation logic 260, FIG. 3 is a flow chart illustrating a process for multi-contextual navigation in a version control system. Beginning in block 310, a context can be set for a default view of a hierarchy for at least one of an ancestor artifact, and one or more contributor artifacts originating from the ancestor artifact. The context can include a property view context, a hierarchical view context, a diagrammatic context, or a textual view context, to name a few. In block 320, the hierarchy can be rendered utilizing a contextual view consistent with the initially set context.

In block 330, a node in the hierarchy can be selected and a navigation directive can be received for navigating from the selected node to a destination node in the hierarchy. In decision block 340, if the navigation directive is an inward navigation directive, in block 350 a default context can be located for a destination node for the navigation directive and in block 360, a contextual view can be rendered according to the located default context. For instance, each of the ancestor artifact view, and the contributor artifact views can be re-rendered utilizing the located default context. Alternatively, only the view associated with the navigation directive can be rendered according to the located default context. In respect to the latter circumstance, the delta navigation logic 260 can provide for a simultaneous, multi-contextual view of the hierarchies for the ancestor artifact and contributor artifacts.

Referring again to FIG. 3, in decision block 340, if the navigation directive is not an inward navigation directive, in decision block 370 it can be determined if the navigation directive is an outward navigation directive. If so, the contextual view rendered for the selected node can be removed from the compare view so that the contextual view of the destination node becomes unobstructed. Finally, in decision block 370, if it is determined that the navigation directive is neither an inward navigation or outward navigation directive, the hierarchy can be traversed to a destination node through the operation of the previous or next navigation directives.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain, store, communicate, or transport the program for use by or in connection with the instruction execution system, apparatus, or device. The storage medium can be an electronic, magnetic, optical, electromagnetic, infrared, or semi-conductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for multi-contextual navigation, the method comprising:
   rendering in a version control system (VCS) executing in memory of a computer one or more objects for an artifact utilizing a default contextual view of the one or more objects;
   rendering, upon determining the existence of a relocated object, an icon configured to be a visual symbol indicating at least one relocated object adjacent to deltas among the one or more objects in the default contextual view;
   rendering, upon determining the existence of a conflicted object, a different icon configured to be a visual symbol indicating at least one conflicted object adjacent to deltas among the one or more objects in the default contextual view;
   selecting one of the one or more objects in the default contextual view and directing an inward navigation to a different object in the default contextual view;
   determining a different contextual view most suitable for the different object; and
   providing in the VCS, subsequent to the determination of the different contextual view most suitable for the different object, at least a portion of the one or more objects defined by the different object responsive to the directing of the inward navigation to the different object.

2. The method of claim 1, wherein the one or more objects are nodes in a hierarchical representation of the artifact.

3. The method of claim 1, wherein the default contextual view is one of a hierarchical view of the one or more objects, a diagrammatic view, a textual view and a properties view.

4. The method of claim 1, wherein rendering the one or more objects for the artifact utilizing the default contextual view of the plurality of objects, comprises rendering one or more objects for each ancestor artifact in an ancestor artifact view and at least one contributor artifact in a contributor artifact view, each within a single compare view.

5. The method of claim 1, wherein selecting one of the one or more objects in the default contextual view and directing the inward navigation to the different object in the default contextual view, comprises:
   receiving a keystroke associated with the directing of the inward navigation of a selected node; and,
   responsive to receiving the keystroke, directing the inward navigation to the different object in the default contextual view.

6. The method of claim 1, wherein providing in the VCS, subsequent to the determination of the different contextual view most suitable for the different object, at least the portion of the one or more objects defined by the different object responsive to the directing of the inward navigation to the different object, comprises providing the different contextual view for at least the portion of the one or more objects for each ancestor artifact in an ancestor artifact view and each contributor artifact in a corresponding contributor artifact view.

7. The method of claim 1, wherein providing in the VCS, subsequent to the determination of the different contextual view most suitable for the different object, at least the portion of the one or more objects defined by the different object responsive to the directing of the inward navigation to the different object, comprises providing the different contextual view for at least the portion of the one or more objects for only one ancestor artifact in an ancestor artifact view and each contributor artifact in a corresponding contributor artifact view.

8. A development platform data processing system configured for processing deltas for an ancestor artifact and a contributor artifact for the ancestor artifact, the data processing system comprising:
   a computing system comprising at least one computer the computer comprising at least one processor and memory;
   a version control system (VCS) executing in the memory of the computing system;
   a compare view in the VCS, the compare view including, upon determining the existence of a relocated object, at least one icon configured to be a visual symbol indicating at least one of a relocated object adjacent to deltas, and the compare view including, upon determining the existence of a conflicted object, a different icon configured to be a visual symbol indicating at least one conflicted object adjacent to deltas;
   a view table coupled to the compare view, the view table configured to store different default contextual views for different nodes in a hierarchical representation of an artifact; and
   delta navigation logic coupled to the compare view, the delta navigation logic comprising program code enabled to respond to inward navigation directives for a node in a default contextual view of the artifact to a different node in the default contextual view of the artifact, to determine in the view table a different contextual view most suitable for the different node from the stored different default contextual views, to render subsequent to the determination of the different contextual view at least a portion of the artifact utilizing the different contextual view specified in the view table, the different contextual view comprising a contextual view selected from the group consisting of diagrammatic contextual view, a properties contextual view and a textual contextual view.

9. A computer program product comprising a computer usable storage device having computer usable program code for multi-contextual navigation, the computer program product including:
   computer usable program code for rendering in a version control system (VCS) executing in memory of a computer a plurality of one or more objects for an artifact utilizing a default contextual view of the plurality of one or more objects;
   computer usable program code for rendering, upon determining the existence of a relocated object, at least one icon configured to be a visual symbol indicating at least one of a relocated object adjacent to deltas among the one or more objects in the default contextual view;
   computer usable program code for rendering, upon determining the existence of a conflicted object, a different icon configured to be a visual symbol indicating at least one conflicted object adjacent to deltas among the one or more objects in the default contextual view;
   computer usable program code for selecting one of the a plurality of one or more objects in the default contextual view and directing an inward navigation to a different object in the default contextual view;
   computer usable program code for determining a different contextual view most suitable for the different object; and
   computer usable program code for providing in the VCS, subsequent to the determination of the different contextual view most suitable for the different object, at least a portion of the plurality of one or more objects defined by the different object responsive to the directing of the inward navigation to the different object.

10. The computer program product of claim 9, wherein the one or more objects are nodes in a hierarchical representation of the artifact.

11. The computer program product of claim 9, wherein the default contextual view is one of a hierarchical view of the one or more objects, a diagrammatic view, a textual view and a properties view.

12. The computer program product of claim 9, wherein the computer usable program code for rendering the one or more objects for the artifact utilizing the default contextual view of the one or more objects, comprises computer usable program code for rendering one or more objects for each ancestor artifact in an ancestor artifact view and at least one contributor artifact in a contributor artifact view, each within a single compare view.

13. The computer program product of claim 9, wherein the computer usable program code for selecting one of the one or more objects in the default contextual view and directing the inward navigation to the different object in the default contextual view, comprises:
   computer usable program code for receiving a keystroke associated with the directing of the inward navigation of a selected node; and,
   computer usable program code for responsive to receiving the keystroke, directing the inward navigation to the different object in the default contextual view.

14. The computer program product of claim 9, wherein the computer usable program code for providing in the VCS, subsequent to the determination of the different contextual view most suitable for the different object, at least the portion of the one or more objects defined by the different object responsive to the directing of the inward navigation to the different object, comprises computer usable program code for providing the different contextual view for at least the portion of the one or more objects for each ancestor artifact in an ancestor artifact view and each contributor artifact in a corresponding contributor artifact view.

15. The computer program product of claim 9, wherein the computer usable program code for providing in the VCS, subsequent to the determination of the different contextual view most suitable for the different object, at least the portion of the one or more objects defined by the different object responsive to the directing of the inward navigation to the different object, comprises computer usable program code for providing the different contextual view for at least the portion of the one or more objects for only one ancestor artifact in an ancestor artifact view and each contributor artifact in a corresponding contributor artifact view.

* * * * *